US009612383B2

(12) United States Patent
Chang et al.

(10) Patent No.: US 9,612,383 B2
(45) Date of Patent: Apr. 4, 2017

(54) LIGHT GUIDE PLATE

(71) Applicant: Radiant Opto-Electronics Corporation, Kaohsiung (TW)

(72) Inventors: Chia-Yin Chang, Kaohsiung (TW); Chin-Ting Weng, Kaohsiung (TW); Shin-Bo Lin, Kaohsiung (TW)

(73) Assignee: Radiant Opto-Electronics Corporation, Kaohsiung (TW)

( * ) Notice: Subject to any disclaimer, the term of this patent is extended or adjusted under 35 U.S.C. 154(b) by 351 days.

(21) Appl. No.: 14/288,398

(22) Filed: May 28, 2014

(65) Prior Publication Data

US 2015/0185398 A1 Jul. 2, 2015

(30) Foreign Application Priority Data

Jan. 2, 2014 (TW) .............................. 103100086 A

(51) Int. Cl.
*F21V 8/00* (2006.01)
(52) U.S. Cl.
CPC ......... *G02B 6/0038* (2013.01); *G02B 6/0063* (2013.01)
(58) Field of Classification Search
CPC ............................ G02B 6/0038; G02B 6/0063
See application file for complete search history.

(56) References Cited

U.S. PATENT DOCUMENTS

| 8,550,687 | B2 * | 10/2013 | Gotou | G02B 6/0038 349/65 |
| 8,684,586 | B2 * | 4/2014 | Kim | G02F 1/133615 362/617 |
| 8,882,326 | B2 * | 11/2014 | Kikuchi | G02B 6/0068 349/62 |
| 9,028,125 | B2 * | 5/2015 | Kikuchi | G02B 6/0038 362/609 |
| 9,075,171 | B2 * | 7/2015 | Kurata | G02B 6/0016 |
| 2005/0002174 | A1 * | 1/2005 | Min | G02B 6/0038 362/609 |
| 2009/0086509 | A1 * | 4/2009 | Omori | G02B 6/0036 362/628 |

FOREIGN PATENT DOCUMENTS

CN 102472454 A 5/2012
CN 202563116 U 11/2012
(Continued)

*Primary Examiner* — Anabel Ton
(74) *Attorney, Agent, or Firm* — CKC & Partners Co., Ltd.

(57) ABSTRACT

A light guide plate includes a main body and trapezoid-like structures. The main body includes a light-incident surface, a first main surface and a second main surface opposite to the first main surface. The trapezoid-like structures are disposed on at least one of the first main surface and the second main surface. The trapezoid-like structures extend along a direction from one side of the main body near the light-incident surface to the other side of the main body away from the light-incident surface. Each of the trapezoid-like structures has a width gradually increasing from one end of the trapezoid-like structure near the light-incident surface to the other end of the trapezoid-like structure away from the light-incident surface. Each of the trapezoid-like structures comprises a flat surface and two side surfaces, and the side surfaces are respectively connected to two sides of the flat surface.

20 Claims, 10 Drawing Sheets

(56) References Cited

FOREIGN PATENT DOCUMENTS

| | | |
|---|---|---|
| CN | 203037888 U | 7/2013 |
| CN | 103424801 A | 12/2013 |
| CN | 203720395 U | 7/2014 |
| TW | 200408829 A | 6/2004 |
| TW | 200422671 A | 11/2004 |
| TW | M309123 | 4/2007 |
| TW | 200839329 A | 10/2008 |
| TW | 201035607 A | 10/2010 |
| TW | 201124760 A | 7/2011 |
| TW | 201131225 A | 9/2011 |

* cited by examiner

LIGHT GUIDE PLATE

RELATED APPLICATIONS

This application claims priority to Taiwan Application Serial Number 103100086 filed Jan. 2, 2014, which is herein incorporated by reference.

BACKGROUND

Field of Invention

The present invention relates to a light guide element. More particularly, the present invention relates to a light guide plate.

Description of Related Art

A conventional light guide plate used in a backlight module has a light-incident surface a light-emitting surface and a reflecting surface. Light provided by a light source enters the light guide plate from the light-incident surface and is emitted out from the light-emitting surface of the light guide plate. Another conventional light guide plate used in a lamp has two light-emitting surfaces opposite to each other. After entering the light guide plate, light provided by the light source is emitted out from the respective light-emitting surfaces. In order to mix the light passing through the light guide plate uniformly, V-shaped or R-shaped microstructures are generally disposed on the light-emitting surfaces of the light guide plate. However, such V-shaped microstructures or R-shaped microstructures would result in the light guide plate with too much light concentration and too strong light directivity. Consequently, the light guide plate viewed from viewing angles will have has obvious brightness and darkness, and bright and dark bands, fringes or hotspots are generated thereon, thus affecting the optical appearance of the light guide plate.

Furthermore, the conventional light guide plate with the V-shaped microstructures is likely to generate white dots or stains on the surface of the V-shaped microstructures due to friction, and tip portions of the V-shaped microstructures are likely to be scratched and collapsed due to collisions, thus seriously affecting the function of the light guide plate.

Hence, there is need to develop a light guide plate to overcome the foregoing problems.

SUMMARY

One aspect of the present invention is to provide a light guide plate, in which optical trends and degrees of light concentration of the light guide plate can be changed by varying shapes, angles, heights, depths or arrangements of trapezoid-like structures, thereby increasing luminance value and luminance uniformity of the light guide plate. In addition, by designing a flat surface on each trapezoid-like structure, the light guide plate can be prevented from being damaged by friction during transportation, thus improving the yield of the light guide plate.

According to the aforementioned objects, the present invention provides a light guide plate. The light guide plate includes a main body and trapezoid-like structures. The main body includes a light-incident surface, a first main surface and a second main surface. The second main surface is opposite to the first main surface, in which the first main surface and the second main surface are respectively connected to the light-incident surface. The trapezoid-like structures are disposed on at least one of the first main surface and the second main surface. The trapezoid-like structures extend along a direction from one side of the main body near the light-incident surface to the other side of the main body away from the light-incident surface. Each of the trapezoid-like structures has a width gradually increasing from one end of the trapezoid-like structure near the light-incident surface to the other end of the trapezoid-like structure away from the light-incident surface. Each of the trapezoid-like structures comprises a flat surface and two side surfaces, and the side surfaces are respectively connected to two sides of the flat surface.

According to an embodiment of the present invention, the first main surface is a light-emitting surface, and the second main surface is a reflecting surface.

According to an embodiment of the present invention, both the first main surface and the second main surface are light-emitting surfaces.

According to an embodiment of the present invention, the trapezoid-like structures are disposed respectively on the first main surface and second main surface.

According to an embodiment of the present invention, ends of the trapezoid-like structures near the light-incident surface are arranged discontinuously.

According to an embodiment of the present invention, ends of the trapezoid-like structures away from the light-incident surface are arranged continuously or discontinuously.

According to an embodiment of the present invention, every two adjacent trapezoid-like structures are spaced at a gap, and a ratio of a distance between the sides of the flat surface to the gap is in a range from 5% to 50%.

According to an embodiment of the present invention, each of the trapezoid-like structures is a convex portion or a concave portion.

According to an embodiment of the present invention, when each of the trapezoid-like structures is the convex portion, a height of the convex portion is gradually increasing from the end of the trapezoid-like structure near the light-incident surface to the other end of the trapezoid-like structure away from the light-incident surface.

According to an embodiment of the present invention, a ratio of the height of the convex portion to a thickness of the main body is in a range from 1% to 10%.

According to an embodiment of the present invention, when each of the trapezoid-like structures is the concave portion, a depth of the concave portion is gradually increasing from the end of the trapezoid-like structure near the light-incident surface to the other end of the trapezoid-like structure away from the light-incident surface.

According to an embodiment of the present invention, a ratio of the depth of the convex portion to a thickness of the main body is in a range from 1% to 10%.

According to an embodiment of the present invention, a distribution area the trapezoid-like structures occupies 20% to 80% of a total area of one of the first main surface the second main surface.

According to an embodiment of the present invention, an angle is included between the side surfaces, and the angle is in a range from 10 degrees to 160 degrees.

According to an embodiment of the present invention, the side surfaces are directly connected to the sides of the flat surface respectively, and the angle is in a range from 30 degrees to 160 degrees.

According to an embodiment of the present invention, the side surfaces are directly connected to the sides of the flat surface respectively, and each of the side surfaces is an arc surface.

According to an embodiment of the present invention, the side surfaces are respectively connected to the sides of the flat surface by two arc surfaces, wherein a width between the sides of the flat surface is defined by an inequality:

$$W < R\left(1 - \sin\frac{\phi}{2}\right)$$

wherein W represents the width, R represents a curvature radius of the arc surfaces, and φ represents the angle.

According to an embodiment of the present invention the curvature radius is in a range from 5 μm to 200 μm.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
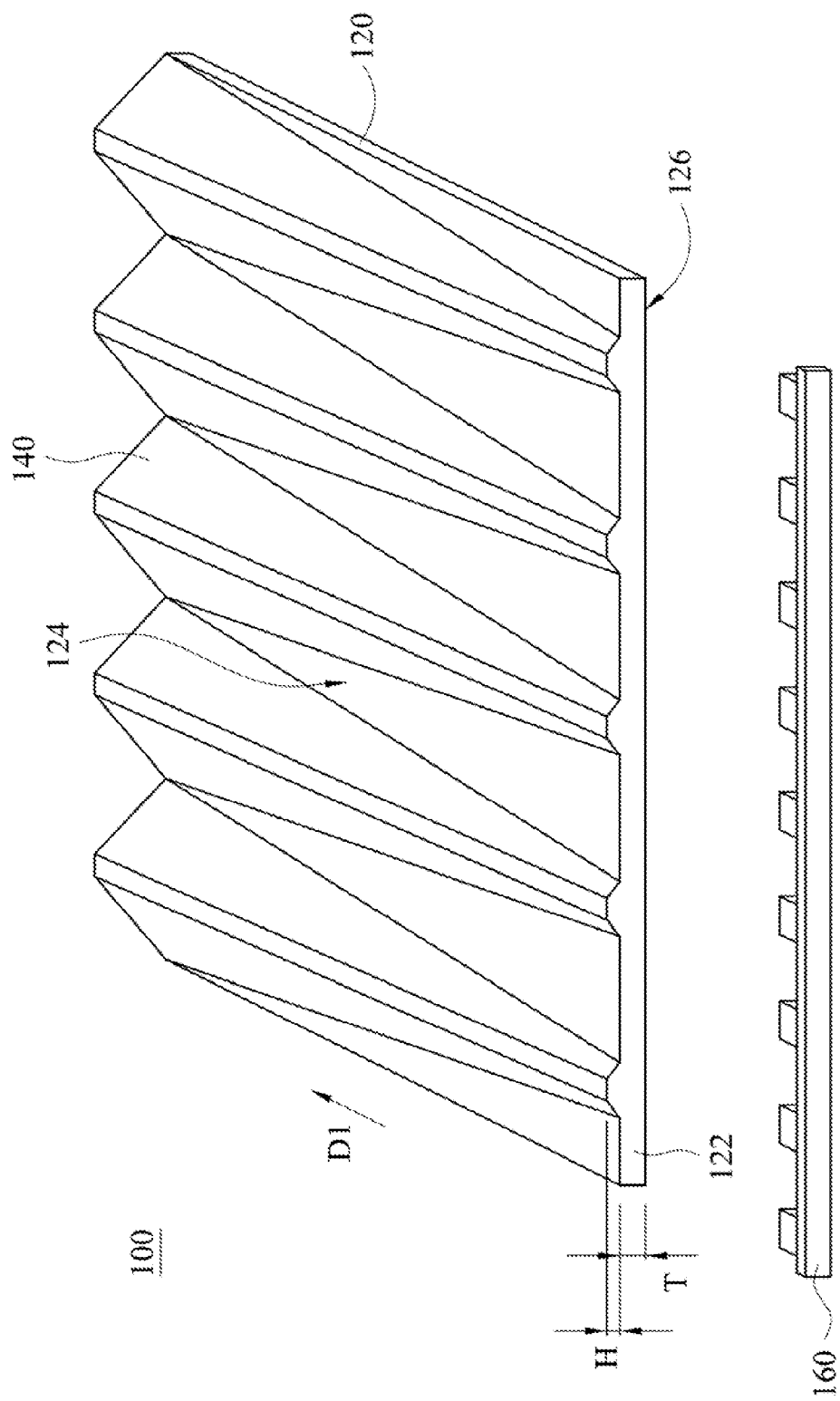
FIG. 1 is a schematic structural diagram showing a light guide plate in accordance with a first embodiment of the present invention.

Reference will now be made in detail to the present embodiments of the invention, examples of which are illustrated in the accompanying drawings. Wherever possible, the same reference numbers are used in the drawings and the description to refer to the same or like parts.

Referring to FIG. 1, FIG. 1 is a schematic structural diagram showing a light guide plate 100 in accordance with a first embodiment of the present invention. The light guide plate 100 is applicable to a backlight module or a lamp. The light guide plate 100 includes a main body 120 and various trapezoid-like structures 140. The trapezoid-like structures are disposed on the main body 120 for changing degrees of light concentration of the light guide plate 100 and adjusting optical trends of light entering and emitted from the light guide plate 100.

In the light guide plate 100, the main body 120 can be a transparent plate or another equivalent transparent element. The main body 120 mainly includes a light-incident surface 122, a first main surface 124 and a second main surface 126. The first main surface 124 and the second main surface 126 are respectively located on two opposite sides of the main body 120. In addition, the light-incident surface 122 connects the first main surface 124 and the second main surface 126. A light source 160 is disposed by the light-incident surface 122, and light generated by the light source 160 will enter the light guide plate 100 from the light-incident surface 122. In some embodiments, when the light guide plate 100 is applied to the backlight module, the first main surface 124 is a light-emitting surface, and the second main surface 126 is a reflecting surface. In other embodiments, when the light guide plate 100 is applied to the lamp, both the first main surface 124 and the second main surface 126 are light-emitting surfaces.

As shown in FIG. 1, the trapezoid-like structures 140 are disposed on the first main surface 124. Meanwhile, each of the trapezoid-like structures 140 extends along an extending direction D1, in which the "extending direction D1" stands for a direction from one side of the first main surface 124 near the light-incident surface 122 to the other side of the first main surface 124 away from the light-incident surface 122. In addition, each of the trapezoid-like structures 140 has a width gradually increasing from one end thereof near the light-incident surface 122 to the other end thereof away from the light-incident surface 122.

Figure 2:
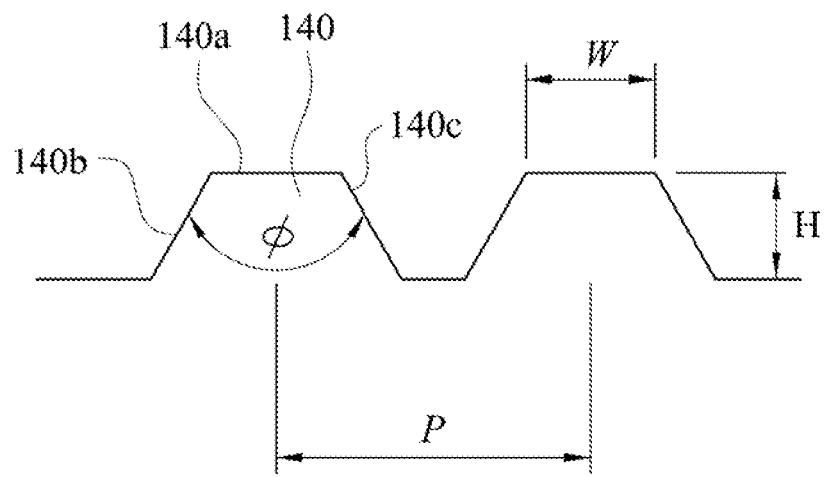
FIG. 2 is a schematic cross-sectional view of one type of trapezoid-like structures in accordance with the first embodiment of the present invention.

Simultaneously referring to FIG. 1 and FIG. 2, FIG. 2 is a schematic cross-sectional view of one type of trapezoid-like structures in accordance with the first embodiment of the present invention. In the present embodiment, each of the trapezoid-like structures 140 is a convex portion protruding from the first main surface 124. As shown in FIG. 2, each of the trapezoid-like structures 140 has a flat surface 140a and two side surfaces 140b and 140c. Meanwhile, the side surfaces 140b and 140c of the trapezoid-like structure 140 are respectively connected to two sides of the flat surface 140a. The flat surface 140a is used to prevent the light guide plate 100 from being damaged during transportation or manufacturing.

An angle φ is included between the side surface 140b and the side surface 140c. In some embodiments, the angle φ is in a range from about 10 degrees to about 160 degrees. When the angle φ is smaller than 10 degrees, inclination angles of the side surface 140b and the side surface 140c become greater, thus resulting in the light guide plate 100 with too strong light concentration which is likely to cause bright bands problems on the light guide plate 100. Meanwhile, when the angle φ is greater than 160 degrees, the side surface 140b and the side surface 140c are placed close to a horizontal plane, and thus the light-gathering capability of the light guide plate 100 is decreased. In the embodiment of FIG. 2, the side surfaces 140b and 140c of the trapezoid-like structure 140 are directly connected to the sides of the flat surface 140a respectively. In other words, in the present embodiment, a cross-sectional profile of each of the trapezoid-like structures is a trapezoid and the angle φ between the side surface 140b and the side surface 140c is in a range from about 30 degrees to about 160 degrees.

Figure 3:
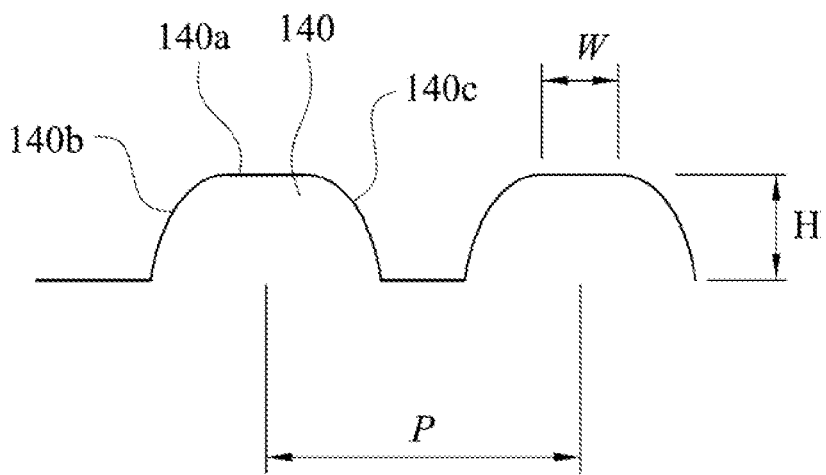
FIG. 3 is a schematic cross-sectional view of another type of trapezoid-like structures in accordance with the first embodiment of the present invention.

Referring to FIG. 3, FIG. 3 is a schematic cross-sectional view of another type of trapezoid-like structures in accordance with the first embodiment of the present invention. In the present embodiment, the side surfaces 140b and 140c of the trapezoid-like structure 140 are also directly connected to the sides of the flat surface 140a respectively. However, both the side surface 140b and the side surface 140c are arc surfaces. In other words, in the present embodiment, each of the trapezoid-like structures 140 is constructed by a flat surface 140a and two arc-shaped side surfaces 140b and 140c.

Figure 4:
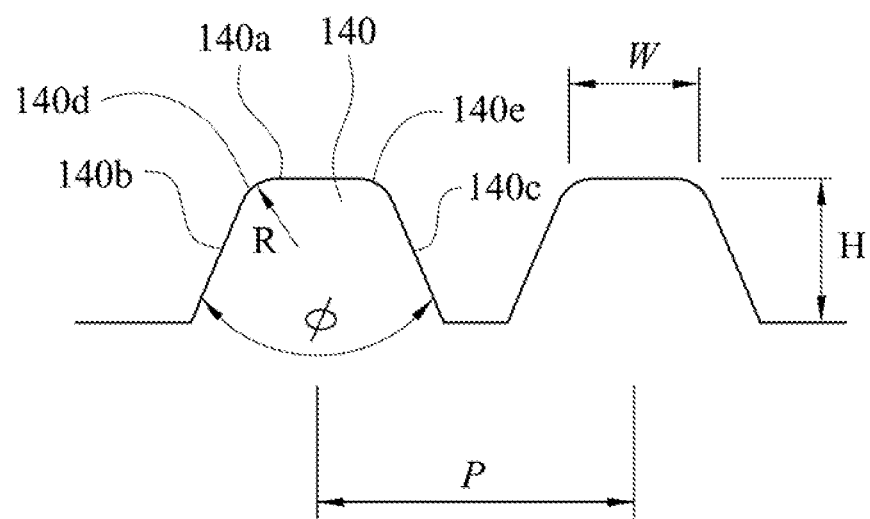
FIG. 4 is a schematic cross-sectional view of another type of trapezoid-like structures in accordance with the first embodiment of the present invention.

Referring to FIG. 4, FIG. 4 is a schematic cross-sectional view of another type of trapezoid-like structures in accordance with the first embodiment of the present invention. In the present embodiment, the side surfaces 140b and 140c of the trapezoid-like structure 140 are respectively connected to the sides of the flat surface 140a by two arc surfaces 140d and 140e, in which the side surfaces 140b and 140c are inclined planes. In other words, a cross-sectional profile of each of the trapezoid-like structures is a trapezoid with rounded corners, in which each of the arc surfaces 140d and 140e has a curvature radius R, and an angle φ is included between the side surfaces 140b and 140c. Meanwhile, each of the trapezoid-like structures 140 has a width W which is defined among, a distance between the sides of the flat surface 140a which are respectively connected to the arc surface 140d and the arc surface 140e. Therefore, a correlation of the width W, the angle φ and the curvature radius R is:

$$W < R\left(1 - \sin\frac{\phi}{2}\right) \quad (1)$$

In the present embodiment, the angle φ is in a range from about 10 degrees to about 160 degrees, and the curvature radius R is in a range from about 5 μm to about 200 μm. Similarly, in the present embodiment, when the angle φ is smaller than 10 degrees or greater than 160 degrees, the light guide plate 100 is likely to generate bright bands or the light-gathering capability of the light guide plate 100 is decreased accordingly.

Meanwhile, optical trends generated by the trapezoid-like structures 140 can be changed by different value definitions of the curvature, radius R. When the curvature radius R is smaller than 5 μm, each of the rounded corners of the trapezoid-like structures 140 does not function because the size of the rounded corners is too small. When the curvature radius R is greater than 200 μm, each of the side surfaces 140b and 140c is likely to form an arc surface instead of inclined plane, thus affecting adjustment of the overall optical trends.

Simultaneously referring to FIG. 2 to FIG. 4, each of the trapezoid-like structures 140 has the width W between the sides of the flat surface 140a. Meanwhile, every two adjacent trapezoid-like structures 140 may have an equal or unequal distance P. Therefore, the arrangement density of the trapezoid-like structures 140 can be changed by adjusting the distance P between every two adjacent trapezoid-like structures 140. Moreover, a ratio of the width W to the distance P is in a range from about 5% to about 50%. It is noted that the width W can be designed corresponding to different optical requirements and the trapezoid-like structures 140 may be arranged on the first main surface 124 in a continuous manner, a discontinuous manner or a partially continuous and partially discontinuous manner, thereby changing light-gathering capability of the light guide plate 100 and further increasing luminance value and luminance uniformity of the light guide plate 100.

Referring to FIG. 2 to FIG. 4 again, when the ratio of the width W to the distance P is less than 5%, the trapezoid-like structures 140 become far from each other and the width W of the flat surface 140a becomes smaller such that a ratio of flat plane on the main body 120 becomes too big, thus resulting in malfunction of the trapezoid-like structures 140 and further decreasing light-gathering capability of the light guide plate 100. When the ratio of the width W to the distance P is greater than 50%, the adjacent trapezoid-like structures 140 are close to each other and the width W of the flat surface 140a becomes greater such that the ratio of the flat plane on the main body 120 becomes too big, thus decreasing light-gathering capability of the light guide plate 100.

Figure 5:
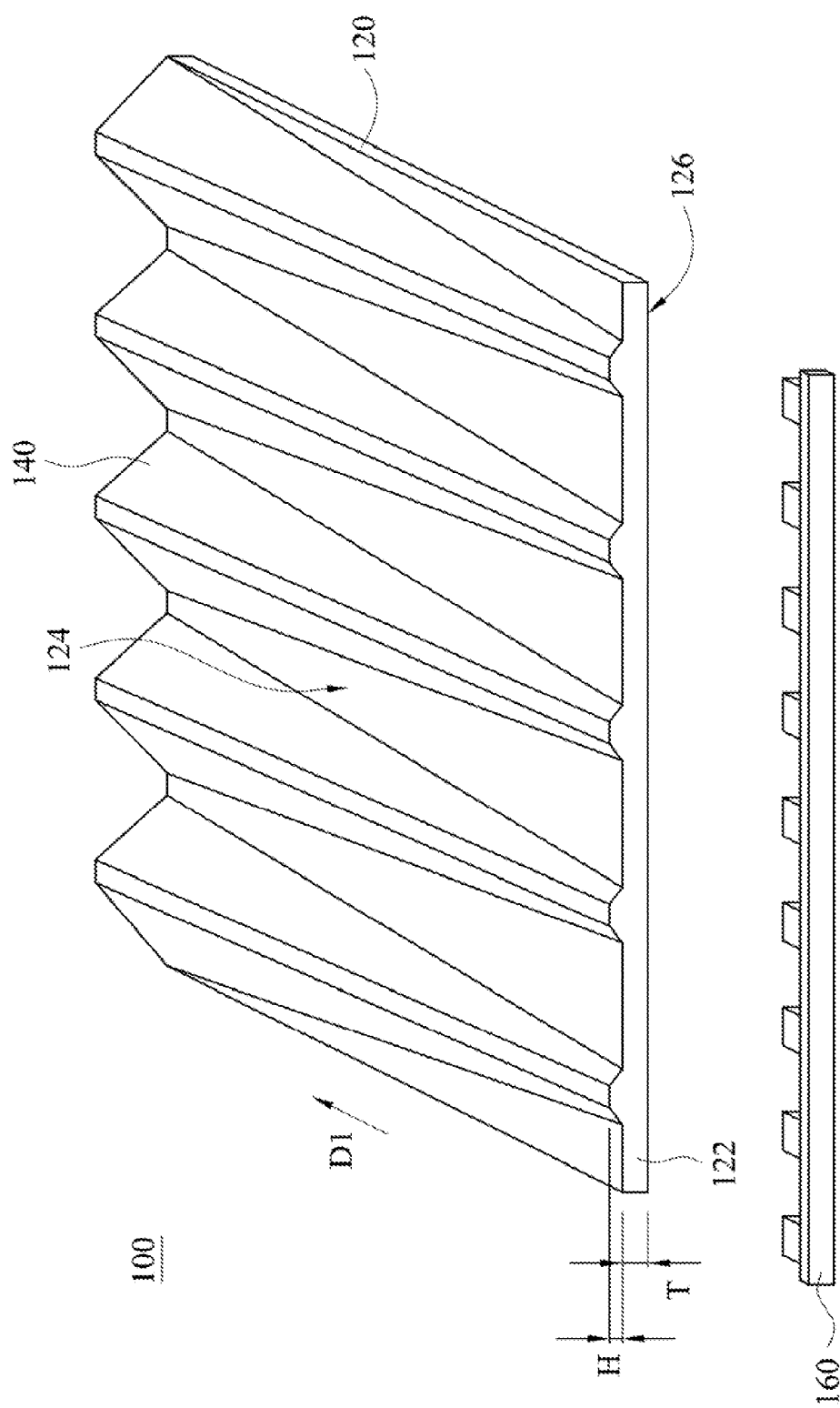
FIG. 5 is a schematic structural diagram showing a light guide plate in accordance with a second embodiment of the present invention.

It is noted that ends of the trapezoid-like structures 140 near the light-incident surface 122 are arranged discontinuously, and ends of the trapezoid-like structures 140 away from the light-incident surface 122 are arranged continuously in the embodiment shown in FIG. 1. In other embodiments, ends of the trapezoid-like structures 140 away from the light-incident surface 122 may be arranged discontinuously. Referring to FIG. 5, FIG. 5 is a schematic structural diagram showing a light guide plate in accordance with a second embodiment of the present invention. In the embodiment of FIG. 5, ends of the trapezoid-like structures 140 near the light-incident surface 122 are arranged discontinuously, and ends of the trapezoid-like structures 140 away from the light-incident surface 122 are also arranged discontinuously.

Simultaneously referring to FIG. 1 and FIG. 5, in one embodiment, a distribution area the trapezoid like structures 140 may occupy 20% to 80% of a total area of the first main surface 124. When the distribution area the trapezoid-like structures 140 is less than 20% of the total area of the first main surface 124, it means that less trapezoid-like structures 140 are distributed, and the ratio of the flat plane on the main body 120 becomes too big, thus decreasing the light-gathering capability of the trapezoid-like structures 140. Moreover, when the distribution area the trapezoid-like structures 140 is more than 80% of the total area of the first main surface 124, it is likely to generate bright bands on the light guide plate 100, thus affecting the overall optical trends.

Referring to FIG. 1 and FIG. 5, besides the width of each of the trapezoid-like structures 140 is gradually increasing along the extending direction D1, a height H of the trapezoid-like structures 140 is also gradually increasing along the extending direction D1 In one embodiment, a ratio of the height H of the trapezoid-like structures 140 to a thickness T of the main body 120 is in a range from about 1% to about 10%. Therefore, optical trends of the light guide plate 100 can be changed by adjusting the width and the height H of the trapezoid-like structures 140. When the ratio of the height H of the trapezoid-like structures 140 to the thickness T of the main body 120 is smaller than 1%, it means that the flat surface 140a of the trapezoid-like structures 140 is placed close to the first main surface 124, the ratio of the flat plane on the main body 120 becomes too big and the optical trends of the trapezoid-like structures 140 cannot be adjusted. When the ratio of the height H to the thickness T of the main body 120 is greater than 10%, inclination angles of the side surface 140b and the side surface 140c become greater, which is likely to generate bright bands on the light guide plate 100. In addition, in one embodiment, the convex portion is formed by injection molding using a mold. Portions of the mold for manufacturing the trapezoid-like structures 140 is formed by a knife-lifting skill from shallow to deep with a R-cut knife, a V-cut knife or a polycrystalline knife, so as to form various cross-sectional profiles of the trapezoid-like structures 140. The trapezoid-like structures 140 with different cross-sectional profiles can generate different light concentration effects. In some embodiments, the second main surface 126 may be implemented with other trapezoid-like structures, V-shaped structures, dotted structures or other microstructures with similar function.

Figure 6:
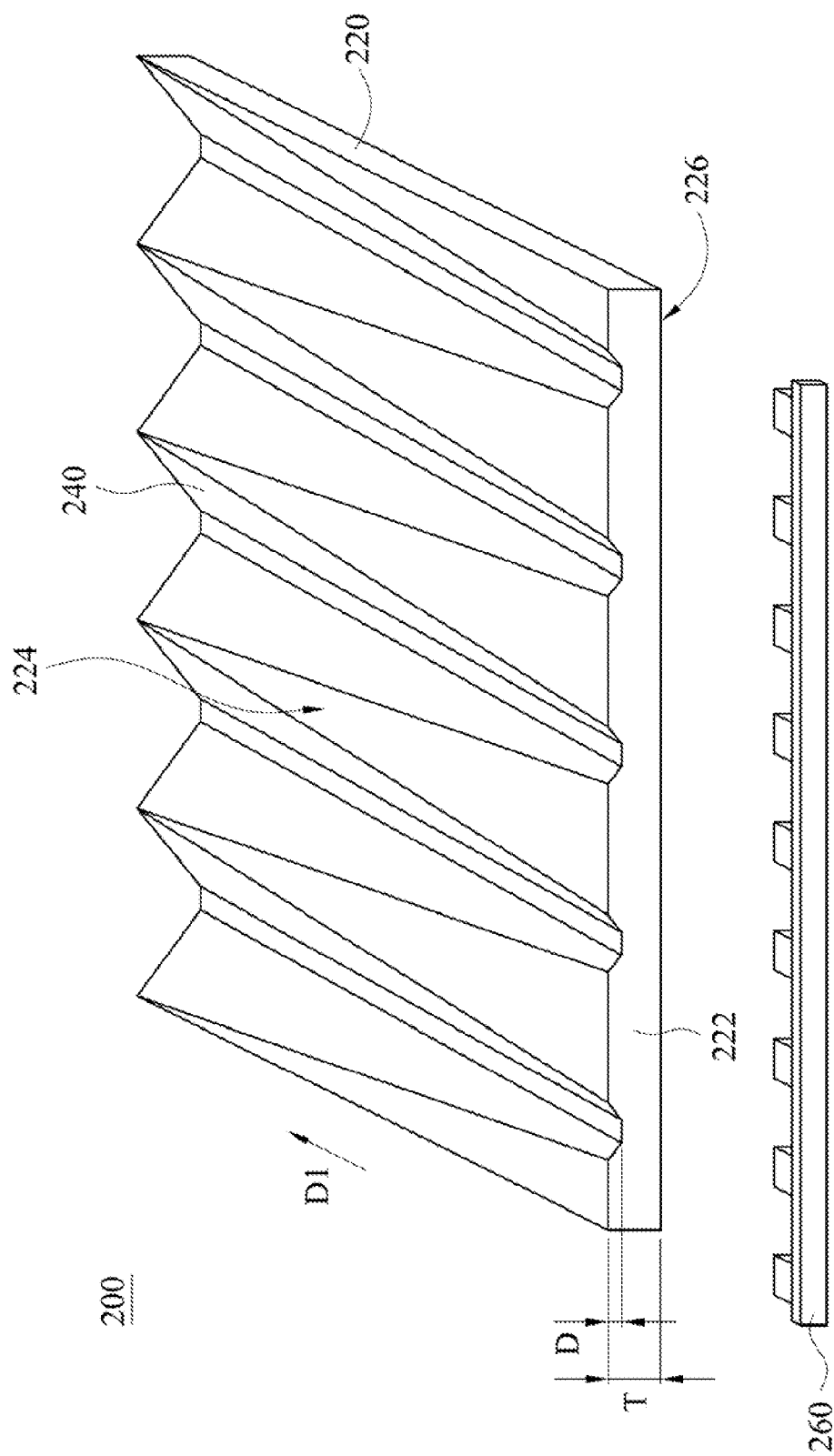
FIG. 6 is a schematic structural diagram showing a light guide plate in accordance with a third embodiment of the present invention.

Referring to FIG. 6, FIG. 6 is a schematic structural diagram showing a light guide plate 200 in accordance with a third embodiment of the present invention. In the present embodiment, the light guide plate 200 includes a main body 220 and trapezoid-like structures 240. The main body 220 mainly includes a light-incident surface 222, a first main surface 224 and a second main surface 226. A light source 260 is disposed by the light-incident surface 222, and light provided by the light source 260 may enter the light guide plate 200 from the light-incident surface 222. As shown in FIG. 6, the trapezoid-like structures 240 are disposed on the first main surface 224. Meanwhile, each of the trapezoid-like structures 240 extends along an extending direction D1, in which the "extending direction D1" stands for a direction from one side of the first main surface 224 near the light-incident surface 222 to the other side of the first main surface 224 away from the light-incident surface 222. Similarly, each of the trapezoid-like structures 240 has a width gradually increasing from one end thereof near the light-incident surface 222 to the other end thereof away from the light-incident surface 222.

Figure 7:
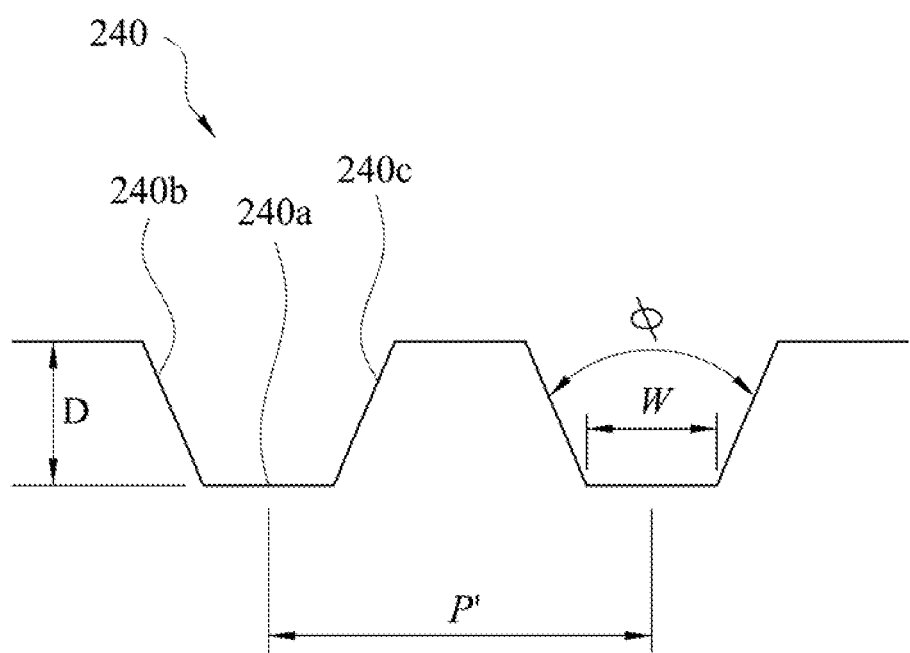
FIG. 7 is a schematic cross-sectional view of one type of trapezoid-like structures in accordance with the third embodiment of the present invention.

Simultaneously referring to FIG. 6 and FIG. 7, FIG. 7 is a schematic cross-sectional view of one type of trapezoid-like structures in accordance with the third embodiment of the present invention. In the present embodiment, each of the trapezoid-like structures 240 is a concave portion recessed into the first main surface 224. As shown in FIG. 7, each of the trapezoid-like structures 240 has a flat surface 240a and two side surfaces 240b and 240c. The side surfaces 240b and 240c of the trapezoid-like structure 240 are respectively connected to two sides of the flat surface 240a. In the embodiment of FIG. 7, the side surfaces 240b and 240c of the trapezoid-like structure 240 are directly connected to the sides of the flat surface 240a, and an angle φ included between the side surface 240b and the side surface 240c is in a range from about 30 degrees to about 160 degrees.

In one embodiment, the trapezoid-like structures 240 are similar to the trapezoid-like structures 140 shown in FIG. 3. The side surfaces 240b and 240c of the trapezoid-like structure 240 are arc surfaces which are directly connected to the sides of the flat surface 240a. In other embodiments, the trapezoid-like structures 240 are similar to the trapezoid-like structures 140 shown in FIG. 4, and the side surfaces 240b and 240c of the trapezoid-like structure 240 are arc surfaces which are directly connected to the sides of the flat surface 240a. Similarly, a distance between the sides of each of the trapezoid-like structures 240 can be defined by the aforementioned correlation (1), and thus are not described again herein.

Referring to FIG. 6 and FIG. 7 again, each of the trapezoid-like structures 240 has the width W between the sides of the flat surface 240a. Meanwhile, every two adjacent trapezoid-like structures 240 may have an equal or unequal distance P'. Therefore, the arrangement density of the trapezoid-like structures 240 can be changed by adjusting the distance P' between every two adjacent trapezoid-like structures 240. Moreover, a ratio of the width W to the distance P' is in a range from about 5% to about 50%. It is noted that the width W can be designed corresponding to different optical requirements and the trapezoid-like structures 240 may be arranged on the first main surface 224 in a continuous manner, a discontinuous s manner or a partially continuous and partially discontinuous manner, thereby changing light-gathering capability of the light guide plate 200 and further increasing luminance value and luminance uniformity of the light guide plate 200. Meanwhile, if the ratio of the width W to the distance P is less than 5% or greater than 50%, light-gathering capability of the trapezoid-like structures 240 decreases accordingly.

Figure 8:
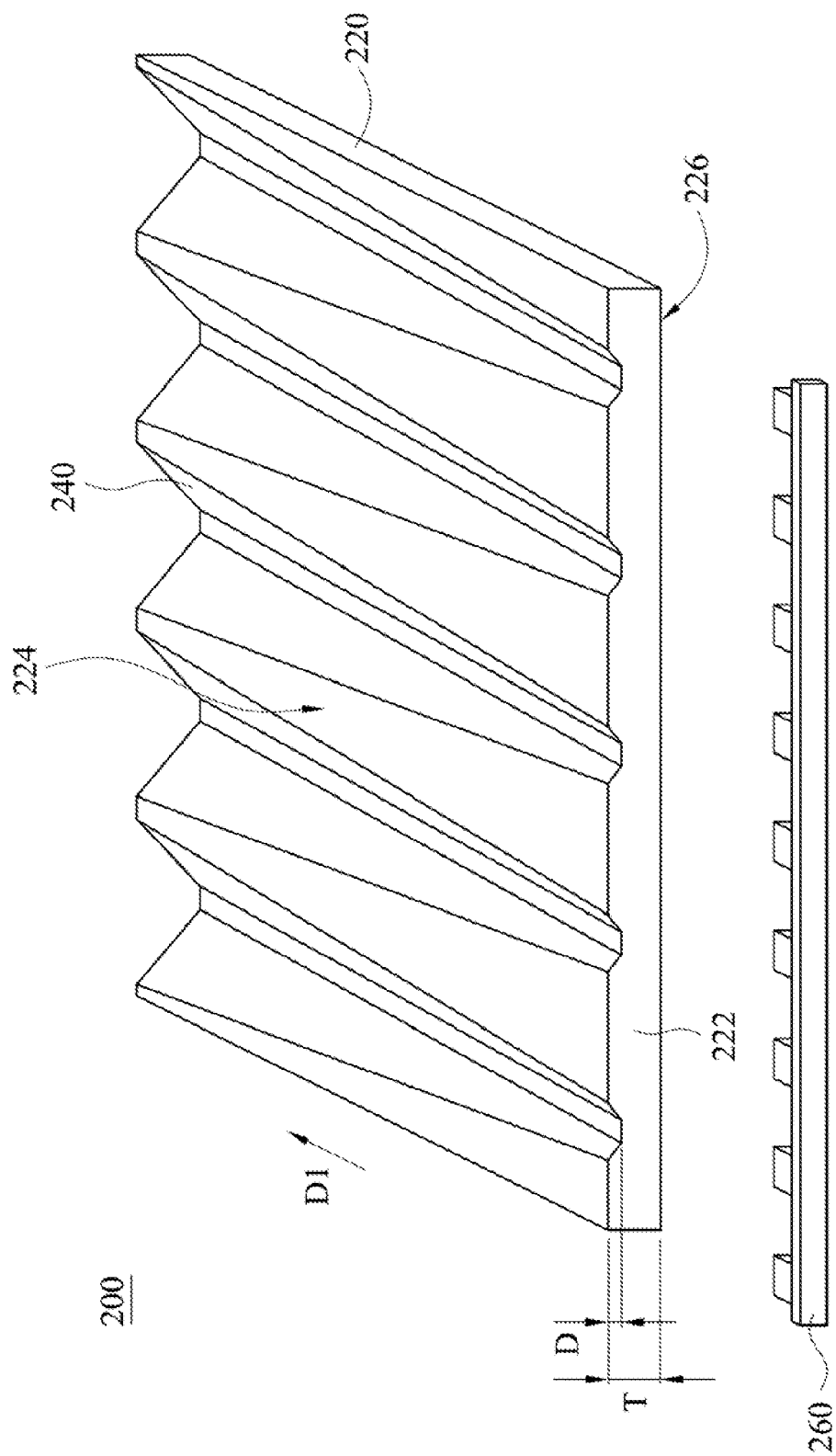
FIG. 8 is a schematic structural diagram showing a light guide plate in accordance with a fourth embodiment of the present invention.

It is not that ends of the trapezoid-like structures 240 near the light-incident surface 222 are arranged discontinuously, and ends of the trapezoid-like structures 240 away from the light-incident surface 222 are arranged continuously in the embodiment shown in FIG. 6. In other embodiments, ends of the trapezoid-like structures 240 away from the light-incident surface 222 may be arranged discontinuously. Referring to FIG. 8, FIG. 8 is a schematic structural diagram showing a light guide plate in accordance with a fourth embodiment of the present invention. In the embodiment of FIG. 8, ends of the trapezoid-like structures 240 near the light-incident surface 222 are arranged discontinuously, and ends of the trapezoid-like structures 240 away from the light-incident surface 222 are also arranged discontinuously.

Simultaneously referring to FIG. 6 and FIG. 8, in one embodiment, a distribution area the trapezoid-like structures 240 may occupy 20% to 80% of a total area of the first main surface 224. When the distribution area the trapezoid-like structures 240 is less than 20% or more than 80% of the total area of the first main surface 224, it is likely to decrease light-gathering capability of the trapezoid-like structures 240 or generate light bands on the light guide plate 200, thus affecting the overall optical trends.

Referring to FIG. 6 and FIG. 8 again, besides the width of each of the trapezoid-like structures 240 is gradually increasing along the extending direction D1, a depth D of the trapezoid-like structures 240 becomes is also gradually increasing along the extending direction D1 In one embodiment, a ratio of the depth D of the trapezoid-like structures 240 to a thickness T of the main body 220 is in a range from about 1% to about 10%. Therefore, the optical trends of the light guide plate 200 and a cross-sectional profile of each of the trapezoid-like structures 240 can be changed by adjusting the width and the depth D of the trapezoid-like structures 240, thereby generating different light-concentration effects. When the ratio of the depth D of the trapezoid-like structures 240 to the thickness T of the main body 220 is smaller than 1%, it means that the flat surface 240a of the trapezoid-like structures 240 is placed close to the first main surface 224, and the ratio of the flat plane on the main body 220 becomes too big, and thus the optical trends of the trapezoid-like structures 140 cannot be adjusted. However, when the ratio of the depth D to the thickness T of the main body 220 is greater than 10%, inclination angles of the side surface 240b and the side surface 240c become greater, which is likely to generate bright bands on the light guide plate 200.

Figure 9:
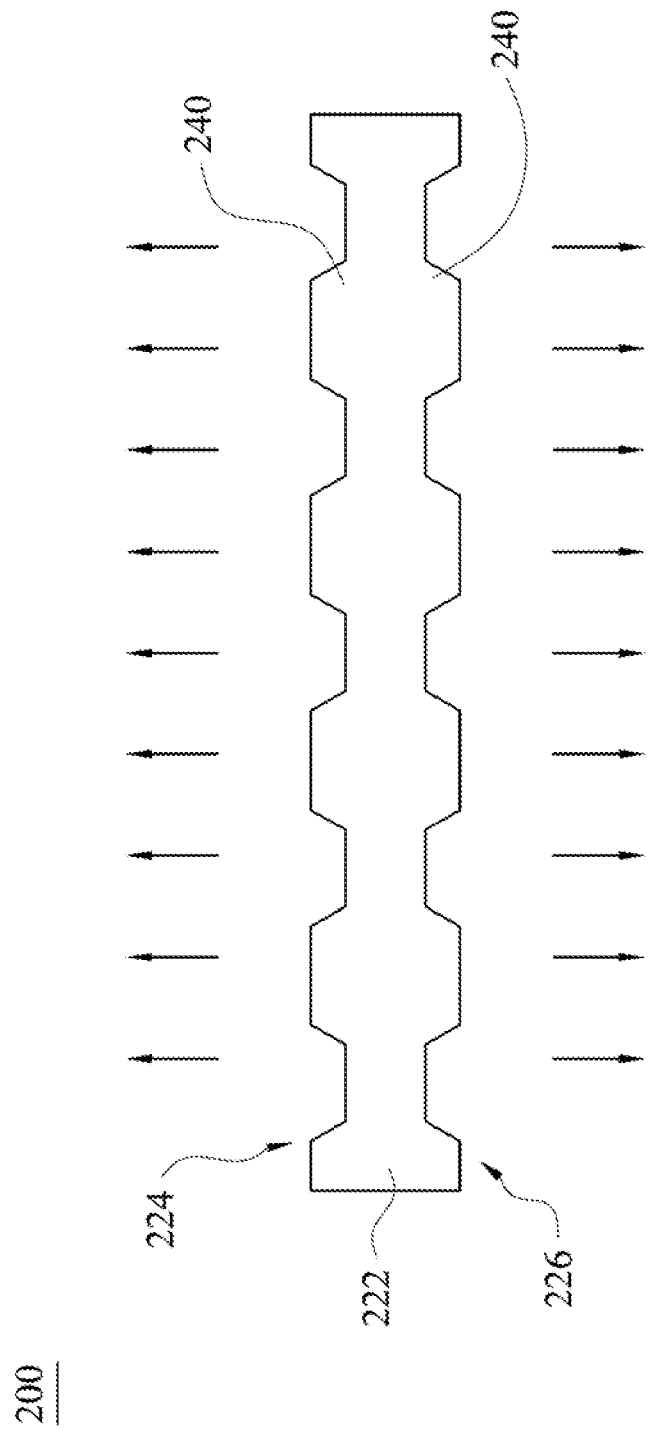
FIG. 9 is a schematic structural diagram showing a light guide plate in accordance with a fifth embodiment of the present invention.
Figure 10:
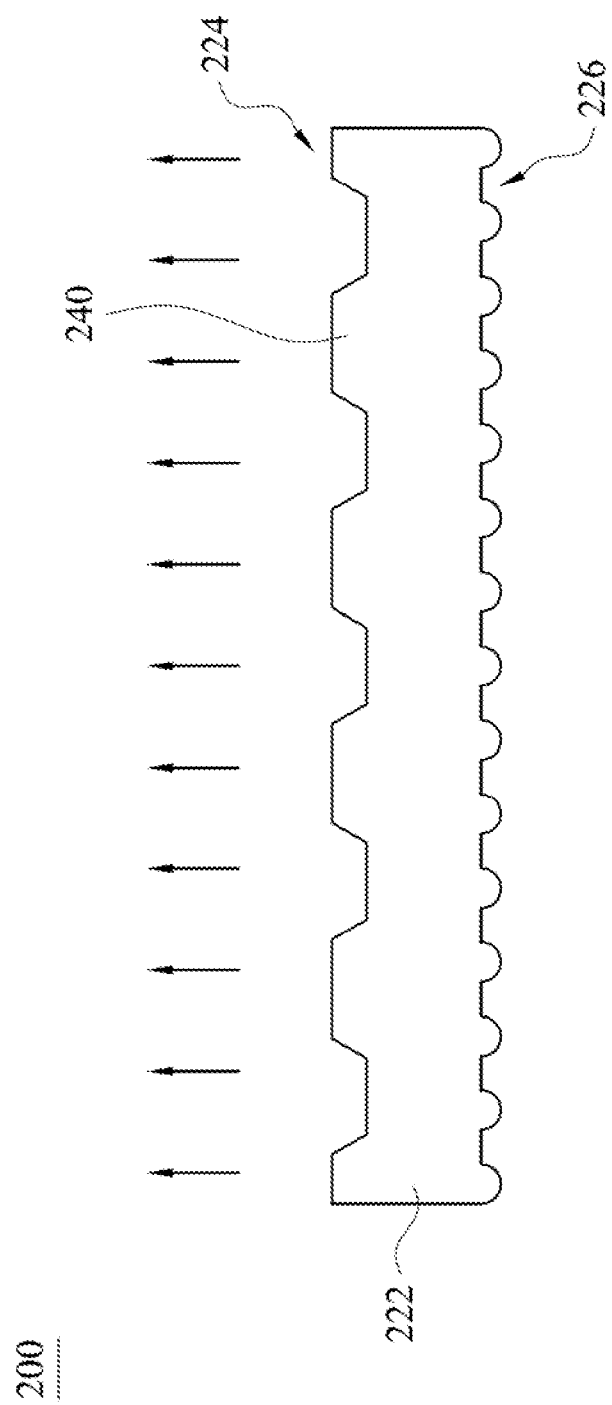
FIG. 10 is a schematic structural diagram showing a light guide plate in accordance with a sixth embodiment of the present invention.

Referring to FIG. 9 and FIG. 10, FIG. 9 is a schematic structural diagram showing a light guide plate in accordance with a fifth embodiment of the present invention, and FIG. 10 is a schematic structural diagram showing a light guide plate in accordance with a sixth embodiment of the present invention. In some embodiments, the first main surface 224 is implemented with the trapezoid-like structures 240, and in addition, the second main surface 226 may be implemented with other trapezoid-like structures, V-shaped structures, dotted structures or other microstructures with similar function. The light guide plate 200 shown in FIG. 9 is a light guide plate with a dual-side light-emitting type. In other words, both the first main surface 224 and the second main surface 226 of the light guide plate 200 in the present embodiment are light-emitting surfaces implemented with trapezoid-like structures. Therefore, after entering the light guide plate 200 from the light-incident surface 222, light provided by the light source may be emitted out from the first main surface 224 and the second main surface 226 respectively. In one embodiment of FIG. 10, the light guide plate 200 is a light guide plate 200 with a one-side light-emitting type. In other words, the first main surface 224 of the light guide plate 200 is a light-emitting surface implemented with trapezoid-like structures 240, and the second main surface 226 is a reflecting surface implemented with dotted structures. Therefore, after entering the light guide plate 200 from the light-incident surface 222, light provided by the light source is emitted out from the first main surface 224.

Figure 11:
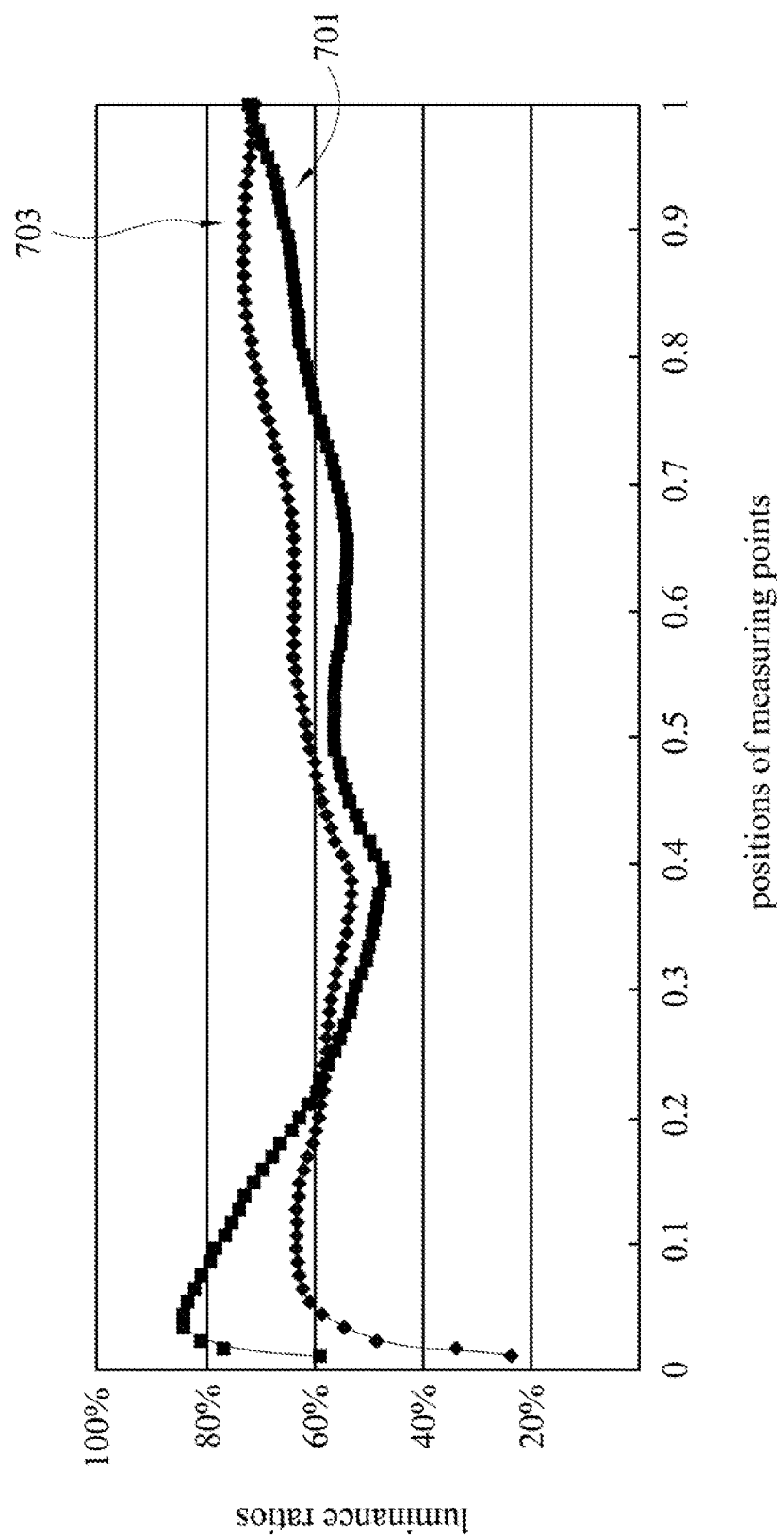
FIG. 11 is a comparison diagram showing luminance performance between the light guide plate of the first embodiment and a conventional light guide plate.

Simultaneously referring to FIG. 1 and FIG. 11, FIG. 11 is a comparison diagram showing luminance performance between the light guide plate of the first embodiment and a conventional light guide plate. Curve 703 in FIG. 11 is obtained from measurement data based on the light guide plate 100 of the first embodiment, in which the angle ϕ of each trapezoid-like structure 140 of the light guide plate 100 is 140 degrees. Curve 701 is obtained from measurement data based on the conventional light guide plate with R-shaped structures. In FIG. 11, the horizontal axis represents positions of respective points on the connecting line from one end near the light-incident surface 122 to the other end away from the light-incident surface 122, in which "0" on the horizontal axis represents the nearest position from the light-incident surface 122, and "1" on the horizontal axis represents the farthest position from the light-incident surface 122. As shown in FIG. 11, curve 701 has relatively large fluctuations, meaning that luminance ratios of the respective points on the conventional light guide plate have large variations and light emitted from the conventional light guide plate is not uniform. In contrast, curve 703 has relatively small fluctuations and is close to a horizontal line, meaning that luminance ratios of the respective points on the light guide plate of the present embodiment are almost the same and light emitted from the light guide plate of the present embodiment is uniform. Therefore, the light guide plate of the present embodiment has better luminance effect than the conventional light guide plate.

In addition, the light guide plate of the present embodiment and conventional light guide plate are used as tested objects in a sliding experiment to compare differences between the light guide plate of the present embodiment and conventional light guide plate. In the sliding experiment, the R-shaped structures on the conventional light guide plate are easily scratched, thus affecting appearance of the conventional light guide plate. However, in the light guide plate of the present embodiment, the flat surface of each of the trapezoid-like structures can prevent the light guide plate from scratching, thus increasing the yield of the light guide plate and decreasing manufacturing cost.

According to the aforementioned embodiments of the present invention, optical trends and degrees of light concentration of the light guide plate can be changed by varying shapes, angles, heights, depths or arrangements of trapezoid-like structures, so as to increase luminance value and luminance uniformity of the light guide plate. Furthermore, by designing the flat surface on each trapezoid-like structure, the light guide plate can be prevented from being damaged by friction during transportation, thus improving the yield of the light guide plate.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A light guide plate, comprising:
   a main body, comprising:
     a light-incident surface;
     a first main surface; and
     a second main surface opposite to the first main surface, wherein the first main surface and the second main surface are respectively connected to the light-incident surface; and
   a plurality of trapezoid-like structures disposed on at least one of the first main surface and the second main surface, wherein the trapezoid-like structures extend along a direction from one side of the main body near the light-incident surface to the other side of the main body away from the light-incident surface, wherein each of the trapezoid-like structures has a width gradually increasing from one end of the trapezoid-like structure near the light-incident surface to the other end of the trapezoid-like structure away from the light-incident surface, wherein each of the trapezoid-like structures comprises a flat surface and two side surfaces, and the side surfaces are respectively connected to two sides of the flat surface.

2. The light guide plate of claim 1, wherein the first main surface is a light-emitting surface, and the second main surface is a reflecting surface.

3. The light guide plate of claim 1, wherein both the first main surface and the second main surface are light-emitting surfaces.

4. The light guide plate of claim 1, wherein the trapezoid-like structures are disposed respectively on the first main surface and second main surface.

5. The light guide plate of claim 1, wherein ends of the trapezoid-like structures near the light-incident surface are arranged discontinuously.

6. The light, guide plate of claim 1, wherein ends of the trapezoid-like structures away from the light-incident surface are arranged continuously or discontinuously.

7. The light guide plate of claim 1, wherein every two adjacent trapezoid-like structures are spaced at a gap, and a ratio of a distance between the sides of the flat surface to the gap is in a range from 5% to 50%.

8. The light guide plate of claim 1 wherein each of the trapezoid-like structures is a convex portion or a concave portion.

9. A light guide plate, comprising:
   a main body, comprising:
     a light-incident surface;
     a first main surface; and
     a second main surface opposite to the first main surface, wherein the first main surface and the second main surface are respectively connected to the light-incident surface; and a plurality of trapezoid-like structures disposed on at least one of the first main surface and the second main surface, wherein the trapezoid-like structures extend along a direction from one side of the main body near the light-incident surface to the other side of the main body away from the light-incident surface, wherein each of the trapezoid-like structures has a width gradually increasing from one end of the trapezoid-like structure near the light-incident surface to the other end of the trapezoid-like structure away from the light-incident surface, wherein each of the trapezoid-like structures comprises a flat surface and two side surfaces, and the side surfaces are respectively connected to two sides of the flat surface;

wherein each of the trapezoid-like structures is a convex portion, a height of the convex portion is gradually increasing from the end of the trapezoid-like structure near the light-incident surface to the other end of the trapezoid-like structure away from the light-incident surface.

10. The light guide plate of claim 9, wherein a ratio of the height of the convex portion to a thickness of the main body is in a range from 1% to 10%.

11. A light guide plate, comprising:
a main body, comprising:
a light-incident surface;
a first main surface; and
a second main surface opposite to the first main surface,
wherein the first main surface and the second main surface are respectively connected to the light-incident surface; and
a plurality of trapezoid-like structures disposed on at least one of the first main surface and the second main surface, wherein the trapezoid-like structures extend along a direction from one side of the main body near the light-incident surface to the other side of the main body away from the light-incident surface, wherein each of the trapezoid-like structures has a width gradually increasing from one end of the trapezoid-like structure near the light-incident surface to the other end of the trapezoid-like structure away from the light-incident surface, wherein each of the trapezoid-like structures comprises a flat surface and two side surfaces, and the side surfaces are respectively connected to two sides of the flat surface;
wherein each of the trapezoid-like structures is a concave portion, a depth of the concave portion is gradually increasing from the end of the trapezoid-like structure near the light-incident surface to the other end of the trapezoid-like structure away from the light-incident surface.

12. The light guide plate of claim 11, wherein a ratio of the depth of the concave portion to a thickness of the main body is in a range from 1% to 10%.

13. The light guide plate of claim 1, wherein a distribution area the trapezoid-like structures occupies 20% to 80% of a total area of one of the first main surface the second main surface.

14. The light guide plate of claim 1, wherein an angle is included between the side surfaces, and the angle is in a range from 10 degrees to 160 degrees.

15. The light guide plate of claim 14, wherein the side surfaces are directly connected to the sides of the flat surface respectively, and the angle is in a range from 30 degrees to 160 degrees.

16. The light guide plate of claim 14, wherein the side surfaces are directly connected to the sides of the flat surface respectively, and each of the side surfaces is an arc surface.

17. The light guide plate of claim 14, wherein the side surfaces are respectively connected to the sides of the flat surface by two arc surfaces, wherein a width between the sides of the flat surface is defined by an inequality:

$$W < R\left(1 - \sin\frac{\phi}{2}\right)$$

wherein W represents the width, R represents a curvature radius of the arc surfaces, and φ represents the angle.

18. The light guide plate of claim 17, wherein the curvature radius is in a range from 5 μm to 200μm.

19. The light guide plate of claim 1, wherein the plurality of trapezoid-like structures are arranged in a plurality of microstructure regions, and a plurality of non-microstructure regions are located between any two adjacent microstructure regions.

20. The light guide plate of claim 1, wherein each of the trapezoid-like structures has a bottom portion which has the width gradually increasing from one end of the trapezoid-like structure near the light-incident surface to the other end of the trapezoid-like structure away from the light-incident surface; and
wherein the flat surface of each of the trapezoid-like structures has a constant width as the distance from the light-incident surface increases from one end of the trapezoid-like structure near the light-incident surface to the other end of the trapezoid-like structure away from the light-incident surface.

* * * * *